(12) United States Patent
Bigolin

(10) Patent No.: US 9,957,007 B2
(45) Date of Patent: May 1, 2018

(54) SADDLE FOR BICYCLES OR MOTORCYCLES

(71) Applicant: SELLE ROYAL S.P.A., Pozzoleone (IT)

(72) Inventor: Barbara Bigolin, Asolo (IT)

(73) Assignee: SELLE ROYAL S.P.A., Pozzoleone (IT)

( * ) Notice: Subject to any disclaimer, the term of this patent is extended or adjusted under 35 U.S.C. 154(b) by 108 days.

(21) Appl. No.: 14/904,327

(22) PCT Filed: Jul. 9, 2014

(86) PCT No.: PCT/IB2014/062962
§ 371 (c)(1),
(2) Date: Jan. 11, 2016

(87) PCT Pub. No.: WO2015/004608
PCT Pub. Date: Jan. 15, 2015

(65) Prior Publication Data
US 2016/0152290 A1 Jun. 2, 2016

(30) Foreign Application Priority Data
Jul. 11, 2013 (IT) .............................. VR2013A0160

(51) Int. Cl.
*B62J 1/02* (2006.01)
*B62J 1/08* (2006.01)
*B62J 1/00* (2006.01)

(52) U.S. Cl.
CPC ................. *B62J 1/02* (2013.01); *B62J 1/005* (2013.01); *B62J 1/08* (2013.01)

(58) Field of Classification Search
CPC .................. B62J 1/00; B62J 1/02; B62J 1/08
USPC ............ 297/195.1, 196, 204, 208, 209, 211; 267/132
See application file for complete search history.

(56) References Cited

U.S. PATENT DOCUMENTS

| 6,007,148 A * | 12/1999 | Yu .............................. B62J 1/02 297/195.1 |
| 6,260,918 B1 * | 7/2001 | Lee ............................. B62J 1/02 297/195.1 |
| 2002/0093230 A1 * | 7/2002 | Bigolin ...................... B62J 1/02 297/208 |

(Continued)

FOREIGN PATENT DOCUMENTS

| DE | 29806597 U1 * | 7/1998 | ................ B62J 1/02 |
| DE | 20305512 | 8/2003 | |
| DE | 202016102893 U1 * | 6/2016 | ................ B62J 1/02 |

(Continued)

*Primary Examiner* — Ryan D Kwiecinski
(74) *Attorney, Agent, or Firm* — Tutunjian & Bitetto, P.C.

(57) ABSTRACT

A saddle for bicycles includes a support body, having a front portion and a rear portion, a pair of pins spaced apart from one another, which project downwards from the bottom of the support body at the rear portion thereof, a saddle rail, an interchangeable damping system, first connection elements for connecting the saddle rail to the front portion and second connection elements for connecting the saddle rail to the rear portion, wherein the second connection elements include a pair of bushes and respective adjustment ring nuts, suitable for compressing at least one elastic element stacked along the pins.

19 Claims, 3 Drawing Sheets

(56) References Cited

U.S. PATENT DOCUMENTS

2005/0029842 A1* 2/2005 Martin ................ B62J 1/02
297/199
2014/0001684 A1* 1/2014 Miyata ................ B62J 1/04
267/132

FOREIGN PATENT DOCUMENTS

EP          2412618         2/2012
JP     2004322945 A  * 11/2004  ............ B62J 1/02

* cited by examiner

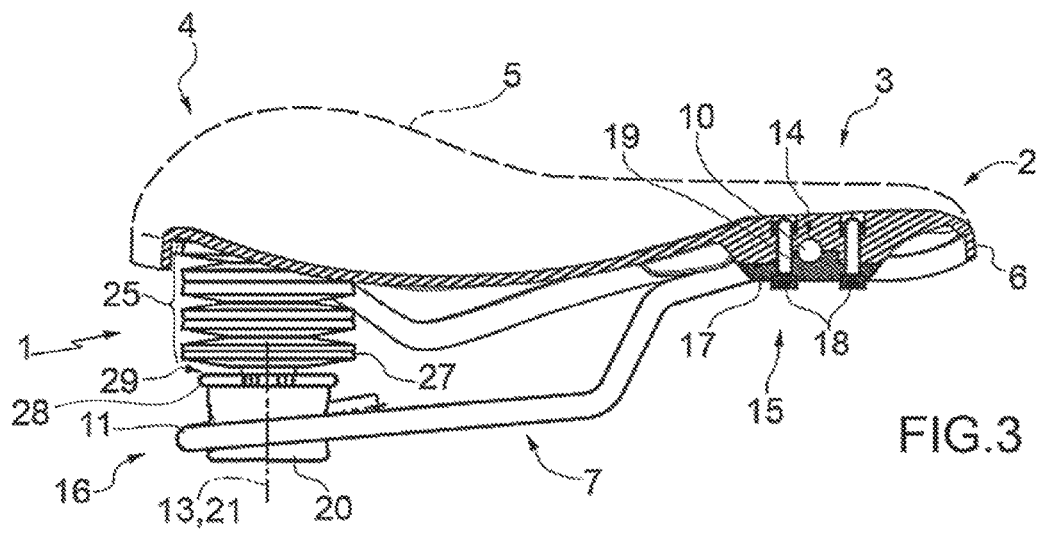
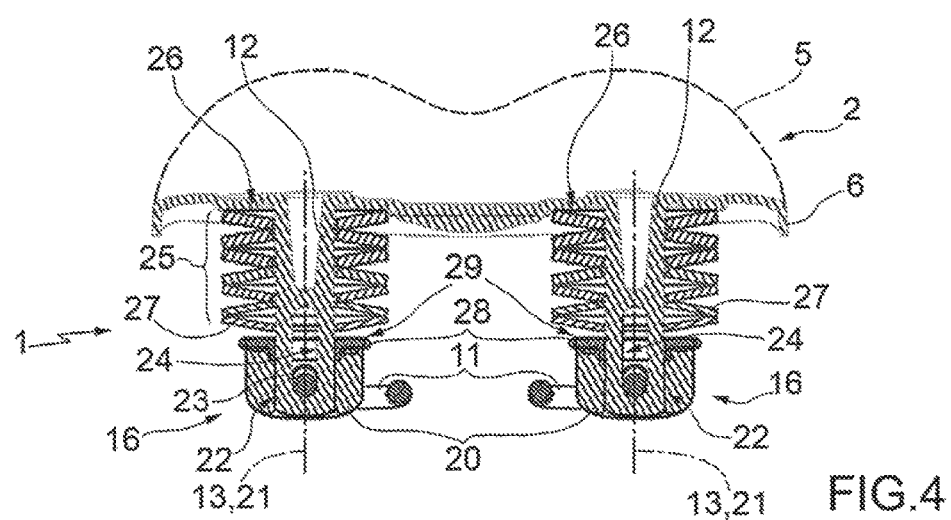
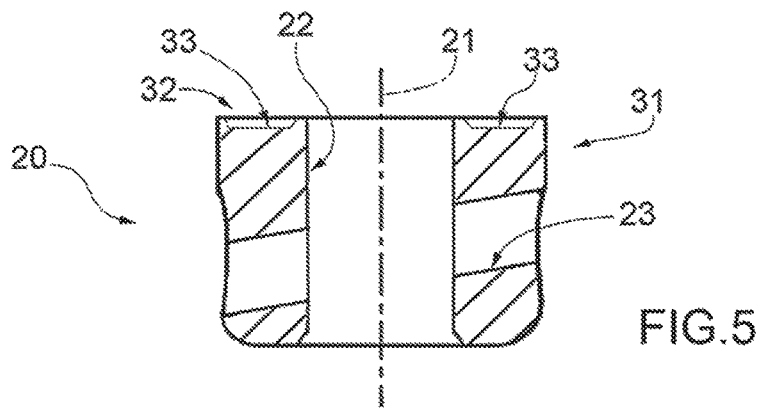

SADDLE FOR BICYCLES OR MOTORCYCLES

TECHNICAL FIELD OF THE INVENTION

The present invention refers to a seat structure that is equipped with a damping system of the interchangeable type, with reference in particular to a saddle for bicycles.

In particular, the present invention refers to a seat that is provided with a damping system in which the damping elements can be easily replaced so as to modify the comfort characteristics of the seat, based upon specific requirements of the users.

STATE OF THE ART

As known, saddles for bicycles have a top padding, of the soft and yieldable type, which is suitable for ensuring a high level of comfort to the user.

Sometimes, however, the top padding by itself is not suitable for ensuring the required comfort.

With reference to seats of the bicycles saddle type, it is known to use one or more elastic elements, arranged at the rear portion, so as to increase the comfort offered to a user during use, thus making it possible to dampen vertical bumps or shaking, caused for example by the asperity of the ground.

The elastic elements can be made in various shapes and from various materials.

For example, it is known to use helical springs, leaf springs, cylindrical buffers in elastomer, etcetera, which are suitable for connecting the rear portion of the rails of the saddle to the lower portion of the body.

The elastic elements make it possible to dampen the bumps and shaking in the vertical direction that the saddle undergoes, dissipating and diminishing them, so as to increase the comfort transmitted to a user.

In US patent n. U.S. Pat. No. 6,007,148 a saddle for bicycles is described comprising a pair of elastic elements in elastomer, which are associated with the rear portion of the saddle itself.

The elastic elements are interconnected with one another through a connection bridge in plastic material.

The elastic elements have central through openings for connecting the same to corresponding appendages which project from the bottom of the body of the saddle.

In turn, each element in elastomer is connected to the body through a closure plug, that can be fixedly connected to the single appendages of the body by a screw, the plug being suitable for determining a preload of the elastic elements themselves.

Such a solution has some drawbacks relative to the operations required for replacing the elements in elastomer and to the costs thereof.

Indeed, in order to be able to remove the elements in elastomer, it is necessary to remove the screws that fixedly connect the saddle rails to the body, both in the front portion and in the rear portion and, therefore, the connection bridge.

Moreover, if it is desired to modify the elastic characteristics of such a damping system it is necessary to replace both the elastic elements with other elements that are provided with different elastic characteristics.

Such elastic elements however are costly to make.

Furthermore, the characterisation of their elastic properties is complex. Indeed, such elastic elements have a complicated shape provided with seats and grooves that are suitable for characterising the elastic behaviour.

As known, the elements in elastomer undergo ageing, due to which there is a deterioration of the elastic properties.

There is thus the need to overcome the drawbacks above indicated, with particular reference to the possibility of being able to easily customise the elastic characteristics of a seat structure that is provided with a damping system, according to a solution that is simple and that has low costs.

SUMMARY OF THE INVENTION

One purpose of the present invention is to improve the state of the art.

A further purpose of the present invention is to provide a seat that is equipped with an interchangeable damping system, in which the elastic properties of the latter can be modified easily so as to satisfy the specific requirements of a user.

Another purpose of the present invention is to provide a seat that is equipped with an interchangeable damping system comprising elastic elements that can be easily found on the market, within a low cost solution.

A further purpose of the present invention is to provide a seat that is equipped with an interchangeable damping system comprising elastic elements that do not suffer from ageing and that are therefore able to maintain their elastic properties substantially unaltered over time.

In accordance with one aspect of the present invention, it is foreseen for there to be a saddle that is equipped with an interchangeable damping system according to present principles.

The present specification refers to preferred and advantageous embodiments of the invention.

BRIEF DESCRIPTION OF THE DRAWINGS

Further characteristics and advantages of the present invention shall become clearer from the detailed description of a preferred, but not exclusive, embodiment of a seat structure that is provided with an interchangeable damping system illustrated as an indication and not for limiting purposes, in the attached drawing tables, in which:

FIG. 3 is a side section view, along the plane III-III, of a saddle provided with an interchangeable damping system according to FIG. 2;

FIG. 4 is a rear section view, along the plane IV-IV, of a saddle that is provided with an interchangeable damping system according to FIG. 2;

FIG. 5 is an enlarged section view of a component of the interchangeable damping system according to FIG. 1;

DETAILED DESCRIPTION OF THE INVENTION

Figure 1:
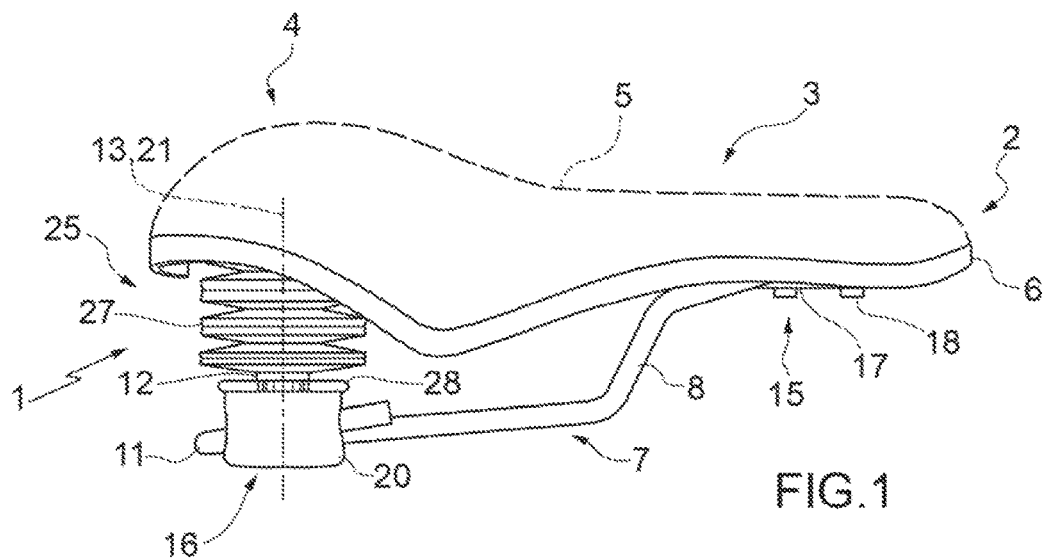
FIG. 1 is a side view of a saddle for bicycles provided with an interchangeable damping system according to the present invention.

With reference to the attached figures, a seat or saddle that is provided with an interchangeable damping system 1 is wholly indicated with reference numeral 2.

The attached figures further illustrate an interchangeable damping system 1 that is associated with a seat 2, for example a bicycle saddle.

However, the present interchangeable damping system 1 can also be applied to other types of seats such as saddles for motorcycles, or seats in general in which it is required for there to be a damping system for damping bumps or vibrations without departing from the scope of protection of the present invention.

The interchangeable damping system 1 according to the present invention makes it possible to replace the elastic elements provided in it, within a solution that is simple and easy to use, so as to modify the elastic characteristics of the seat itself by adapting it, therefore, to specific comfort needs required by various users.

Moreover, it is possible to easily modify the elastic characteristics of the interchangeable damping system 1 by acting on a system for adjusting the preload of the elastic elements, as better described in the rest of the description.

With reference to the embodiment illustrated in the attached figures, the interchangeable damping system 1 is foreseen for being connected in a removable manner to a seat or saddle 2.

According to one version of the present invention, the seat or saddle 2 comprises a front portion 3, with an elongated shape, a rear portion 4, with a widened shape, a top padding 5, a support body 6, to which the padding 5 is fixedly connected at the top, and a saddle rail 7, which is reversibly connected to the support body 6, for connecting the seat or saddle 2 to a frame of a bicycle or to other equivalent support means, which are not illustrated in the figures.

According to other versions of the present invention, the shape of the seat or saddle 2 can be any, and there may not be padding 5.

Figure 2:
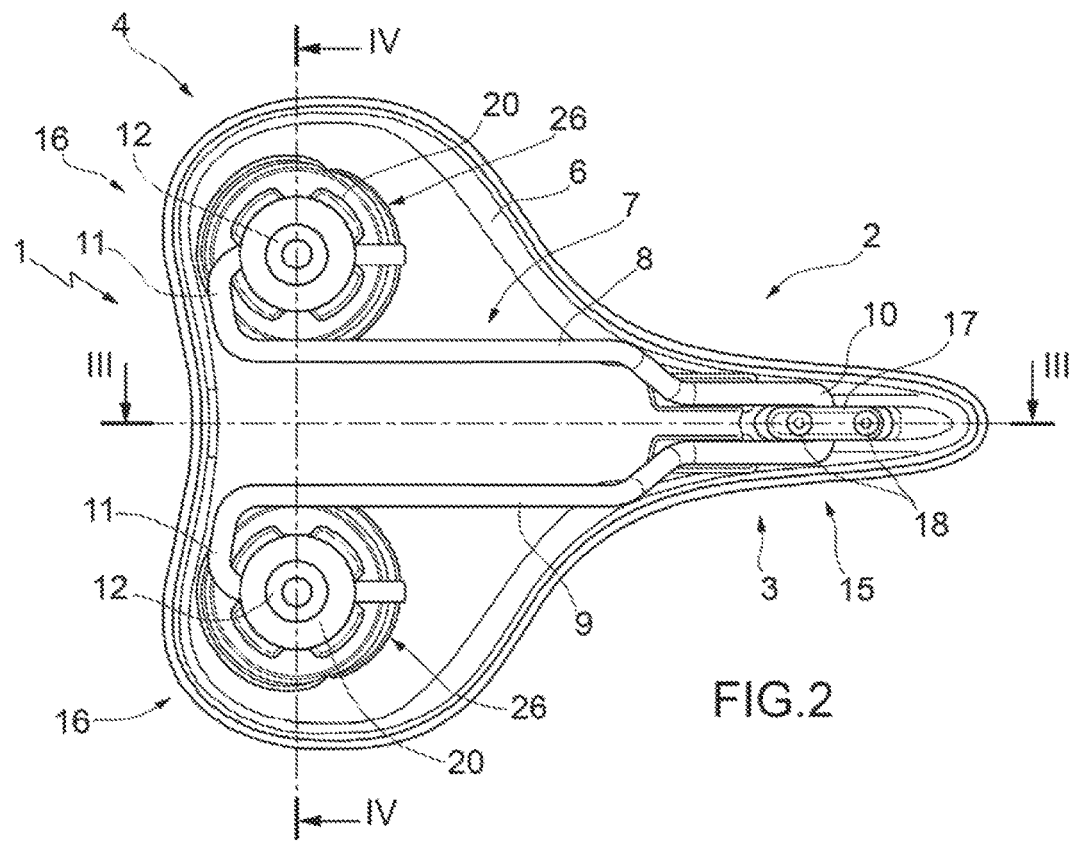
FIG. 2 is a view from below of the saddle provided with an interchangeable damping system according to FIG. 1.

The saddle rail 7 has two arms 8, 9 that are connected to one another at the front end 10 of the saddle rail 7 itself (FIG. 2).

Such arms 8, 9 project, in use, towards the rear portion 4 of the seat or saddle 2.

Moreover, in one version of the present invention, the two arms 8, 9 preferably comprise at least one first section and a second section. The first section has a downward inclination that is greater than that of the second section which also projects inclining downwards.

As illustrated in FIG. 2, each of the arms 8, 9, at the rear portion of the saddle rail 7, which in use corresponds to the rear end part of the seat or saddle 2, is bent back over itself by around 180°, so as to form a substantially "U"-shaped portion 11.

The support body 6 comprises, at the rear portion 4 of the seat or saddle 2, a pair of pins 12, spaced apart from one another, which, in use, project downwards from the bottom of the support body 6 itself.

The pins 12, which have a substantially elongated shape, develop along corresponding axes 13, which are perpendicular to the sitting plane of the saddle 2.

As illustrated in the section view of FIG. 3, at the front portion 3 of the seat or saddle 2, the support body 6 can comprise, at the bottom, a seat 14 for housing the front end 10 of the saddle rail 7.

The seat or saddle 2 comprises first connection means 15 and second connection means 16 for removably connecting the saddle rail 7 to the support body 6.

In particular, the first connection means 15 are foreseen at the front portion 3 of the seat or saddle 2. The second connection means 16 are foreseen at the rear portion 4 of the seat or saddle 2.

The first connection means 15 comprise a locking element 17 for locking the saddle rail 7 against the lower portion of the support body 6, and at least one screw 18 for the removable connection of the locking element 17 itself against the lower surface of the support body 6.

In turn the locking element 17 has a housing 19 (FIG. 3) for housing at least one portion of the front end 10 of the saddle rail 7.

With reference to the section view illustrated in FIG. 3, the saddle rail 7 is associated to the support body 6, at the bottom thereof, in a removable manner, at the front portion 3 of the saddle 2 through the first connection means 15.

The second connection means 16 comprise a pair of substantially cylindrical bushes 20.

Each bush 20 can be associated in a sliding manner along a corresponding pin 12 (FIG. 4).

Each bush 20, moreover, can be engaged by a respective rounded end 11 of the saddle rail 7, through fit-coupling, as shall be described in greater detail in the rest of the description.

In particular, each bush 20 has a longitudinal axis (FIG. 5) which, when the bush 20 is inserted along the pin 12, substantially corresponds to the axis 13 of the pin 12 itself. The sliding direction of the bush 20 along the pin 12 is substantially identified by the longitudinal axis 21.

Each bush 20 has a first through opening 22 developing along the longitudinal axis 21 and passing through the entire bush 20, and a second through opening 23, passing through the entire bush 20, along a direction that is substantially transverse with respect to the first opening 22.

The first through opening 22 allows the bush 20 to slide along a corresponding pin 12 that, in use, is inserted inside the first through opening 22 itself.

The second through opening 23, which is slightly inclined with respect to the longitudinal axis 21 of the bush 20 itself, is foreseen for allowing a portion of a corresponding end 11 of the saddle rail 7 to be inserted and housed through the bush 20 itself.

In particular, each end 11 of the saddle rail 7 can be introduced in a sliding manner through a corresponding bush 20, by inserting it in the second through opening 23. Each pin 12 has, at a lower end, a slot 24 having vertical development.

When the bush 20 is fitted along the pin 12, the second through opening 23 is substantially inside the edge of the slot 24.

Therefore, through each slot 24 it is possible to insert a corresponding rear end 11 of the saddle rail 7 and, moreover, it is possible to ensure a sliding thereof in a vertical direction.

Along each pin 12 there is at least one elastic element 25.

Preferably, a plurality of elastic elements 25 are stacked in succession with one another along each pin 12.

As illustrated in FIGS. 1, 3 and 4 the plurality of elastic elements 25 is compressed along a corresponding pin 12 that is arranged between the lower portion of the support body 6 and the second connection means 16.

The support body 6, at the base of each pin 12, has a seat 26 for the abutment of the elastic elements 25.

In particular, the seat 26 has a substantially circular shape and makes it possible to block the lateral movements of the elastic elements 25.

The seat 26 makes it possible to keep at least one of the elastic elements 25 in position with respect to the pin 12 and to the support body 6 itself.

In such a way it is ensured that there is greater stability in the connection of the elastic elements 25 that are stacked along respective pins 12, since the elastic element 25, that in use is in abutment against the support body 6, is held in position, being held laterally by the edge of the seat 26, ensuring a stable support for the following elastic elements 25.

The elastic elements 25 comprise elastic washers 27. As an example, the elastic washers 27 can be of the cup type, also known as "Belleville washers" or of the elastic washer or thrust washer or curved or undulated type or the like.

In use, the single elastic elements 25 are connected to a respective pin 12 stacked in succession with one another, oriented with the same and/or opposite direction. The elastic washers 27 are made from plastic material, with great elastic and wear resistance properties.

As an example but not for limiting purposes, the plastic material can be selected from the group made of acetal resins, polyester resins, copolyester PET or the like.

According to a further embodiment, the elastic washers 27 are made from metal material or from metal alloys or from composite material that are sufficiently strong and suitable for withstanding the stress that the elastic washers 27 themselves are subjected to in use.

According to the number, to the shape and to the arrangement of the elastic washers 27 stacked along each pin 12 it is possible to easily modify the elastic characteristics of the interchangeable damping system 1.

In particular, is possible to use thick or thin elastic washers 27 which, for the same circumferential bulk, have an elastic constant that is different from one another.

In such a way it is possible to modify the elastic characteristics of the interchangeable damping system 1 inside a very wide range, practically unlimited, in an extremely flexible solution.

According to one aspect of the present invention, in order to modify the elastic characteristics of the interchangeable damping system 1, the elastic elements 25 can be stacked in succession with one another along each pin 12 with a direction that is the same as and/or opposite one another.

It should be noted that in the attached figures, along the pins 12, as an example and not for limiting purposes, three pairs of elastic washers 27 are illustrated, stacked with their concavity facing inwards with respect to each pair.

However, further configurations and stacking schemes are possible, comprising a greater or lower number of elastic washers 27, possibly arranged in succession with one another with a different orientation, without for this reason departing from the scope of protection of the present invention.

By using the elastic elements 25 above indicated it is possible to easily customise the elastic properties of the interchangeable damping system 1 according to specific requirements of the single users.

Concerning this, it should be noted that in order to modify the elastic response of the interchangeable damping system 1, it is possible to act, in a simple and rapid manner, on various parameters such as, for example, the number of elastic washers 27 used, their conformation, the direction with which they are stacked on one another, etcetera.

As an example, if a seat or saddle 2 is used by many users with different weights, it is possible to optimise the elastic characteristics of the damping system 1 of the seat or saddle 2 by simply acting upon the second connection means 16 and on the at least one elastic element 25, thus always ensuring a high comfort level offered by the seat or saddle 2.

As previously disclosed, each rear end 11 of the saddle rail 7 is inserted passing through the second through opening 23 of the bush 20 and the slot 24 of the pin 12.

In use, each rear end 11 of the saddle rail 7 can move with respect to the rear portion 4 of the saddle 2 along a vertical direction, substantially corresponding to the axis 13 of a respective pin 12 to which each rear end 11 is operatively connected.

The relative movement between the rear end 11 of the saddle rail 7 and the support body 6 of the seat or saddle 2 determines the compression of the plurality of elastic elements 25 that are stacked along the two pins 12 and, therefore, the compression of the interchangeable damping system 1.

The second connection means 16 comprise a pair of ring nuts 28, for adjusting the preload of the elastic elements 25 which, in use, are stacked and can slide along a respective pin 12.

In use, each adjustment ring nut 28 is positioned along a respective pin 12, interposed between a respective bush 20 and the at least one elastic element 25.

Preferably, the adjustment ring nut 28 is substantially annular and is mounted so as to be capable of rotating around the pin 12.

Preferably, the second connection means 16 are suitable for compressing the at least one elastic element 25. Even more preferably, the at least one elastic element 25 is compressed by the adjustment ring nuts 28.

With reference to the rear portion 4 illustrated in FIGS. 1, 3, 4 and 6, the adjustment ring nut 28 is operatively associated, at the bottom, with a bush 20 and, at the top, with the lowest elastic washer 27 between the plurality of elastic elements 25 that are stacked along a respective pin 12, i.e. the first elastic washer 27 from the bottom.

It should be noted that in order to make the components that are illustrated in the aforementioned figures easier to understand, the adjustment ring nut 28 is separated from the bush 20 or from the at least one elastic element 25.

In use the adjustment ring nut 28, on the other hand, is in abutment, at the bottom, against the bush 20 and, at the top, against the first of the at least one elastic element 25 starting from the bottom.

Figure 6:
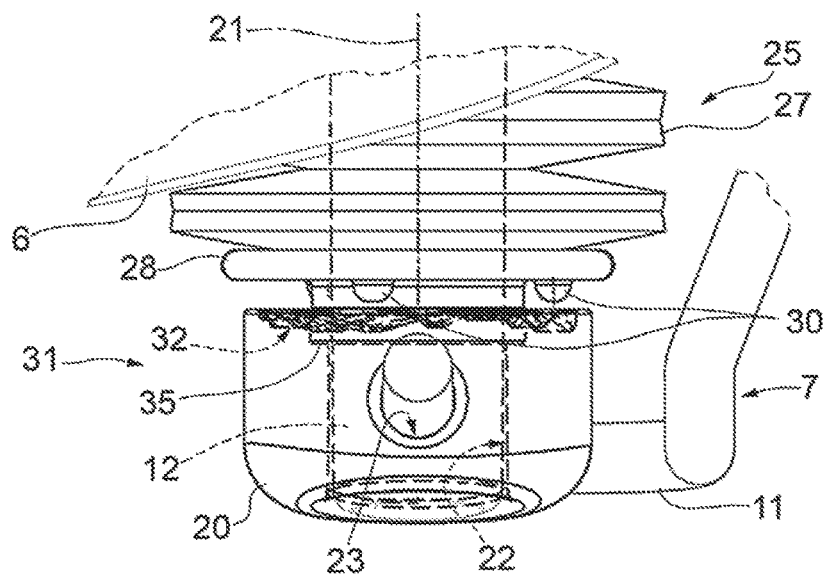
FIG. 6 is an enlarged front view of a portion of the interchangeable damping system illustrated in FIG. 1.
Figure 7:
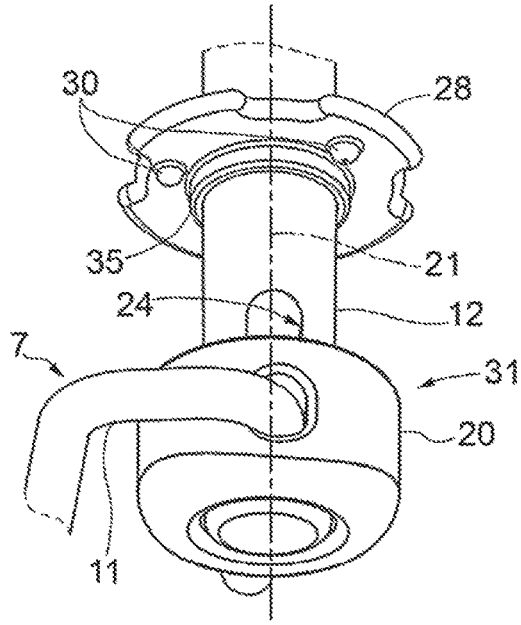
FIG. 7 is an enlarged perspective view from below of some components of the interchangeable damping system illustrated in FIG. 1.
Figure 8:
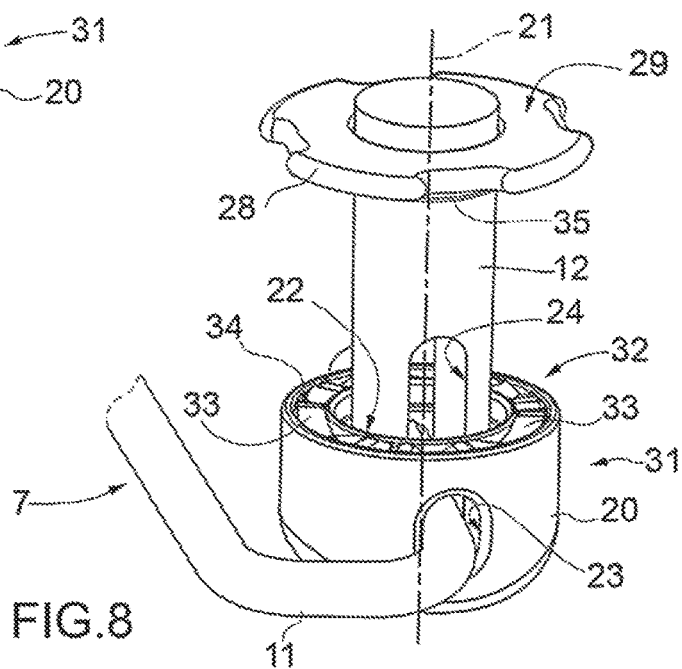
FIG. 8 is a perspective view from above of an enlarged detail of the interchangeable damping system according to FIG. 7.

FIGS. 6-8 illustrate an enlarged detail of the adjustment ring nut 28.

The adjustment ring nut 28 has, at the top, a substantially flat surface 29 and, at the bottom, a plurality of elements in relief 30, which project in a vertical direction.

The substantially flat surface 29, in use, is placed in abutment against an elastic washer 27.

The adjustment ring nut 28, and in particular its flat surface 29, makes it possible to discharge on the at least one elastic element 25, stacked along the pins 12, the vertical stresses and the shaking that is transmitted by the saddle rail 7.

With reference to the detail illustrated in FIG. 8, each bush 20 has, at its upper portion 31, a circumferential seat 32 that is suitably shaped.

In particular, the circumferential seat 32 has a profile that can vary along a vertical direction, comprising a plurality of spaces 33 that are alternated with crests 34.

The single spaces 33 have inclined portions and grooves with different depths as shall be indicated in greater detail in the rest of the description.

It is worth underlining that the overall number of spaces 33 and of crests 34 is a multiple of the number of elements in relief 30 that project from the ring nut 28. Each bush 20, therefore, has one or more groups of spaces and of crests 34, in which each group comprises a number of spaces 33 and of crests 34 that is equal to the number of elements in relief 30.

More in detail, the spaces 33 belonging to the same group have grooves with a predetermined depth that is different from that of the grooves belonging to another group.

Each adjustment ring nut 28 then has a guide sleeve 35 along the pin 12.

The sleeve 35 is substantially coaxial with the through opening present in the adjustment ring nut 28 itself.

The sleeve 35 makes it possible for there to be stable sliding without jamming of the adjustment ring nut 28 along the pin 12, ensuring a fluid sliding of the ends 11 of the saddle rail 7 along the through openings 24 made in the pins 12.

In accordance with one aspect of the present invention, the assembly of the interchangeable damping system 1 of the seat or saddle 2 according to the present invention is briefly disclosed in the rest of the description.

In order to carry out the assembly of the interchangeable damping system 1 of the seat or saddle 2, firstly the at least one elastic element 25 is stacked along each pin 12. Then the adjustment ring nuts 28 are inserted along the respective pins 12, with the flat surface 29 facing towards the at least one elastic element 25, until each ring nut 28 is placed in abutment against the end elastic element 25 among those stacked along each pin 12. Subsequently, each bush 20 is engaged along a respective pin 12, bringing each bush 20 near to a respective adjustment ring nut 28 until the elements in relief 30 are housed in corresponding spaces 33 of the bush 20 itself.

The through opening 23 of each bush is then aligned with the slot 24 formed along a respective pin 12.

Then, each rear end 11 of the arms 8, 9 of the saddle rail 7 is introduced through a respective through opening 23 of the bushes 20, thus engaging the rear portion 11 of the saddle rail 7 with the rear portion 4 of the support body 6.

Finally, the front portion 10 of the saddle rail 7 is connected to the front portion 3 of the support body 6 through the first connection means 15.

With reference to the connection between the adjustment ring nuts 28 and the respective bushes 20, it is worth underlining that since the depth of the groove of the single spaces 33 can vary, the relative distance of each adjustment ring nut 28 is determined with respect to the bush 20, along a direction that coincides with the longitudinal axis 21, according to the shape of the spaces 33 in which the elements in relief 30 are housed.

In particular, by rotating the adjustment ring nut 28 around the longitudinal axis 21 the elements in relief 30 are moved in successive spaces 33, that have grooves with a different depth with respect to the spaces 33 to which the elements in relief 30 were previously coupled.

In such a way, the relative distance between the adjustment ring nut 28 and the bush 20 is modified.

The adjustment of the relative distance between the adjustment ring nut 28 and the bush 20 is carried out in predetermined positions, as a function of the number and of the shape with which the grooves of the spaces 33 are made along the shaped circumferential seat 32.

Actually, by increasing the relative distance between the adjustment ring nut 28 and the corresponding bush 20 the preload of the elastic elements 25 is increased, thus increasing the strength of the interchangeable damping system 1.

Vice versa, by reducing the relative distance between the adjustment ring nut 28 and the corresponding bush 20 the preload of the elastic elements 25 is reduced.

By acting on the single adjustment ring nuts 28, therefore, it is possible to modify a further parameter relative to the elastic properties of the interchangeable damping system 1, in an easy and rapid manner, i.e. the preloading of the elastic elements 25.

Moreover, by moving the position of each adjustment ring nut 28 along a respective pin 12, the position of the corresponding bush 20 respect to the body 6 is not modified, and hence the variation of the position of the adjustment ring nuts 28 substantially keeps the distance of the saddle rail 7 from the body 6 unvaried. The saddle rail 7, as we have already mentioned, is connected to the bushes 20.

In practice, by acting on the single ring nuts 28 the predetermined configuration of the saddle rail 7 is not changed.

More in detail, according to the angle and to the direction towards which the adjustment ring nuts 28 are rotated around the longitudinal axis 21 of the pins 12, it is possible to increase/decrease the preload of the at least one elastic element 25 so as to comply with specific requirements of the users.

This is particularly advantageous if it is necessary to modify the elastic characteristics of the interchangeable damping system 1 without having to replace any elastic washer 27 from those stacked along the pins 12.

If during use a user desires to further modify the elastic characteristics of the saddle 2, provided with an interchangeable damping system 1, he can remove the first connection means 15, thus disengaging the front end 10 of the saddle rail 7 from the support body 6, slide the rear ends 11 of the saddle rail 7 off from the pins 12 and from the bushes 20 and, then, remove the bushes 20 and the adjustment ring nuts 28 sliding them off from the respective pins 12, so as to be able to access the at least one elastic element 25.

In particular, it should be noted that the bushes 20 do not have any further locking element suitable for fixedly connecting them to the pins 12.

The connection between the bushes 20 and the respective pins 12, indeed, is determined by the insertion of the two rear ends 11 of the saddle rail 7 through the corresponding slots 24 of the pins 12 and the second through openings 23 of the bushes 20.

The removal of the second connection means 16 from the corresponding pins 12 is easy and fast to carry out.

Following the removal of the second connection means 16, it is possible to slide off one or more from the at least one elastic elements 25 that are stacked along the pins 12.

In order to modify the elastic properties of the interchangeable damping system 1, therefore, it is possible to replace one or more of the elastic elements 25 with elastic elements 25 that are provided with different elastic characteristics.

Furthermore, it is possible to modify the elastic properties of the interchangeable damping system 1 simply by modifying the stacking orientation of one or more of the at least one elastic element 25, i.e. of the elastic washers 27, along the pins 12.

This is particularly advantageous since it does not require any elastic element 25 to be replaced.

The invention thus conceived is characterised by extreme flexibility and practicality of use since it is possible to modify the elastic characteristics of the interchangeable damping system 1 in a substantially unlimited manner, with a simple and cost-effective solution.

Indeed, the elastic characteristics of the interchangeable damping system 1 can be modified by varying the sizes, the materials, the number of single elastic washers, the orientation with which they are stacked along the pins 12 and, moreover, their preload. Furthermore, the removal of the second connection means 16 from the support body 6 is easy to carry out, thus promoting the simplicity of use of the interchangeable damping system 1 according to the present invention.

The invention thus conceived can undergo numerous modifications and variants all covered by the inventive concept.

Moreover, all the details can be replaced by other technically equivalent elements. In practice, the materials used, as well as the contingent shapes and sizes, can be any according to the requirements without for this reason departing from the scope of protection of the following claims.

The invention claimed is:

1. A saddle for bicycles or motorcycles comprising a support body having a front portion and a rear portion, a pair of pins spaced apart from one another, said pins projecting outwardly from a bottom of said support body at said rear portion, a saddle rail for connecting said saddle to a support frame, said saddle rail comprising a pair of arms that project towards said rear portion each provided with an end portion, an interchangeable damping system, first connection means, of the removable type, for connecting said saddle rail to said front portion, second connection means, of the removable type, for connecting each of said arms to said rear portion, at said pair of pins, and at least one elastic element mounted along at least one of said pins and arranged between said support body and said second connection means, said second connection means being configured for compressing said at least one elastic element and comprise a pair of bushes and a pair of respective adjustment ring nuts, each of which are slidingly engaged along a respective one of said pins, wherein each of said adjustment ring nuts is arranged between one of said bushes and said at least one respective elastic element and each of said adjustment ring nuts is rotatable along a longitudinal axis of each of said pins for adjusting the preload of said at least one elastic element, each of said adjustment ring nuts being operatively associated to a respective one of said bushes so that the relative distance between said adjustment ring nut and said respective one of said bushes modifiable due to a direction of rotation of the adjustment ring nut, wherein an increase of relative distance between said adjustment ring nut and a respective one of said bushes corresponding in an increase of the preload of said at least one elastic element and a reduction of said relative distance between said adjustment ring nut and a respective of said bush corresponding in a reduction of the preload of said at least one elastic element.

2. The saddle for bicycles or motorcycles according to claim 1, wherein said at least one elastic element comprises a plurality of slidingly engageable elastic elements in succession with one another along a respective one of said pins.

3. The saddle for bicycles or motorcycles according to claim 2, wherein said elastic elements of said plurality of slidingly engageable elastic elements are stacked in succession with one another, oriented with at least one of the same and opposite direction as one another, along said pins.

4. The saddle for bicycles or motorcycles according to claim 1, wherein each of said adjustment ring nuts has, at the top, a substantially flat surface in abutment against said at least one elastic element and, at the bottom, a plurality of elements in relief, projecting from said adjustment ring nut, operatively engaged with a respective one of said bushes.

5. The saddle for bicycles or motorcycles according to claim 4, wherein each of said bushes has a shaped circumferential seat at an upper portion thereof, comprising a plurality of spaces alternated with a plurality of crests, for housing said elements in relief.

6. The saddle for bicycles or motorcycles according to claim 5, wherein said plurality of spaces have different depths suitable for determining respective predefined relative distances between each of said bushes and each of said at least one adjustment ring nuts.

7. The saddle for bicycles or motorcycles according to claim 1, wherein each of said bushes comprises a first through opening substantially extending along a respective longitudinal axis, and a second through opening, substantially transversal with respect to said first through opening.

8. The saddle for bicycles or motorcycles according to claim 7, wherein a respective pin is inserted inside said first through opening, whereas said second through opening of said bush is engaged with one of said end portions of said arms, passing through said bush.

9. The saddle for bicycles or motorcycles according to claim 1, wherein each of said pins has, at a lower end, a slot having vertical development.

10. The saddle for bicycles or motorcycles according to claim 1, wherein said at least one elastic element comprises a plurality of elastic washers stacked in succession with one another.

11. The saddle for bicycles or motorcycles according to claim 10, wherein said elastic washers are of the spring washer, disc, thrust washer, curved or undulated type.

12. The saddle for bicycles or motorcycles according to claim 10, wherein said elastic washers are made from plastic material of at least one of the elastic type, acetal resin, polyester resins, and copolyester PET.

13. The saddle for bicycles or motorcycles according to claim 1, wherein said first connection means comprise a locking element for locking said saddle rail against said support body and at least one screw for connecting said locking element to said support body, said connection being of the removable type.

14. The saddle for bicycles or motorcycles according to claim 1, wherein each of said arms at said rear end portion of said saddle rail, is bent back over itself so as to form a substantially "U"-shaped portion.

15. The saddle for bicycles or motorcycles according to claim 1, wherein said support body comprises, at the bottom, at each pin a seat for the abutment and the at least partial housing of at least one of said elastic elements.

16. The saddle for bicycles or motorcycles according to claim 1, wherein said at least one elastic element is compressed by said adjustment ring nuts.

17. The saddle for bicycles or motorcycles according to claim 1, wherein said saddle rail is connected to said bushes and wherein the variation of the position of said adjustment ring nuts, with respect to respective bushes along said pin, occurs while keeping the distance of said saddle rail from said body unaltered.

18. A saddle for bicycles or motorcycles comprising a support body having a front portion and a rear portion, a pair of pins spaced apart from one another, said pins projecting outwardly from a bottom of said support body at said rear portion, a saddle rail for connecting said saddle to a support frame, said saddle rail comprising a pair of arms that project towards said rear portion each provided with an end portion, an interchangeable damping system, first connection means, of the removable type, for connecting said saddle rail to said front portion, second connection means, of the removable type, for connecting each of said arms to said rear portion, at said pair of pins, and at least one elastic element mounted along at least one of said pins and arranged between said support body and said second connection means, said second connection means being suitable for compressing said at least one elastic element and comprise a pair of bushes and a pair of respective adjustment ring nuts, each of which are slidingly engaged along a respective one of said pins, wherein each of said adjustment ring nuts is arranged between one of said bushes and at least one respective elastic element and each of said adjustment ring nuts is configured for enabling the adjustment of the preload of said at least one elastic element, each of said adjustment ring nuts being operatively associated to respective one of said bushes so that the relative distance between said adjustment ring nut and said bush is modifiable, wherein an increase of relative distance between said adjustment ring nut and a respective of said bushes corresponding in an increase of the preload of said at least one elastic element and a reduction of said relative distance between said adjustment ring nut and a respective of said bush corresponding in a reduction of the preload of said at least one elastic element,

- wherein each of said adjustment ring nuts has a plurality of elements in relief, projecting from a bottom of said adjustment ring nut, operatively engaged with a respective one of said bushes, and
- wherein each of said bushes has, at an upper portion, a shaped circumferential seat, comprising a plurality of spaces alternated with a plurality of crests, for housing said elements in relief.

19. A saddle for bicycles or motorcycles comprising a support body having a front portion and a rear portion, a pair of pins spaced apart from one another, said pins projecting outwardly from a bottom of said support body at said rear portion, a saddle rail for connecting said saddle to a support frame, said saddle rail comprising a pair of arms that project towards said rear portion each provided with an end portion, an interchangeable damping system, first connection means, of the removable type, for connecting said saddle rail to said front portion, second connection means, of the removable type, for connecting each of said arms to said rear portion, at said pair of pins, and at least one elastic element mounted along at least one of said pins and arranged between said support body and said second connection means, said second connection means being suitable for compressing said at least one elastic element and comprise a pair of bushes and a pair of respective adjustment ring nuts, each of which are slidingly engaged along a respective one of said pins, wherein each of said adjustment ring nuts is arranged between one of said bushes and at least one respective elastic element and each of said adjustment ring nuts is configured for enabling the adjustment of the preload of said at least one elastic element, each of said adjustment ring nuts being operatively associated to a respective one of said bushes so that the relative distance between said adjustment ring nut and said bush is modifiable, wherein an increase of relative distance between said adjustment ring nut and respective one of said bushes corresponding in an increase of the preload of said at least one elastic element and a reduction of said relative distance between said adjustment ring nut and respective one of said bushes corresponding in a reduction of the preload of said at least one elastic element,

- wherein each of said adjustment ring nuts has, at a top, a generally flat surface in abutment against said at least one elastic element and, at the bottom, a plurality of elements in relief, projecting from said adjustment ring nut, operatively engaged with a respective one of said bushes, and
- wherein each of said bushes has, at an upper portion, a shaped circumferential seat, comprising a plurality of spaces alternated with a plurality of crests, for housing said elements in relief.

* * * * *